United States Patent
Mrawek et al.

(10) Patent No.: US 11,314,069 B2
(45) Date of Patent: Apr. 26, 2022

(54) MICROSCOPE HAVING A FREELY PROGRAMMABLE LASER PULSE SEQUENCE, AND CORRESPONDING METHOD

(71) Applicant: Leica Microsystems CMS GmbH, Wetzlar (DE)

(72) Inventors: Patric Mrawek, Hassloch (DE); Thorsten Koester, Edingen-Neckarhausen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 172 days.

(21) Appl. No.: 16/607,366

(22) PCT Filed: Apr. 25, 2018

(86) PCT No.: PCT/EP2018/060533
§ 371 (c)(1),
(2) Date: Oct. 23, 2019

(87) PCT Pub. No.: WO2018/197530
PCT Pub. Date: Nov. 1, 2018

(65) Prior Publication Data
US 2020/0301122 A1    Sep. 24, 2020

(30) Foreign Application Priority Data

Apr. 25, 2017  (DE) .................... 10 2017 108 834.2

(51) Int. Cl.
*G02B 21/06*  (2006.01)
*G02B 21/00*  (2006.01)

(52) U.S. Cl.
CPC ....... *G02B 21/0076* (2013.01); *G02B 21/008* (2013.01); *G02B 21/0032* (2013.01)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 6,462,345 B1  10/2002  Simon et al.
6,614,031 B2   9/2003  Engelhardt et al.
(Continued)

FOREIGN PATENT DOCUMENTS

DE   102004017956 A1  11/2005
DE   102012216002 B3   9/2013
(Continued)

OTHER PUBLICATIONS

Sun, Yuansheng et al. "Tunable PIE and synchronized gating detections by FastFLIM for quantitative microscopy measurements of fast dynamics of single molecules," Progress in Biomedical Optics and Imaging, SPIE—International Society for Optical Engineering, Bellingham, WA, US, vol. 9712, Mar. 14, 2016, pp. 97120S-97120S, XP060064798.
(Continued)

*Primary Examiner* — Arnel C Lavarias
(74) *Attorney, Agent, or Firm* — Leydig, Voit & Mayer, Ltd.

(57) ABSTRACT

A microscope includes an illumination system configured to illuminate a sample chamber with laser pulses. The illumination system includes a control device with stored, modifiable illumination parameters, with trigger outputs, to which at least one externally triggerable laser system is connectable in each case, and with a trigger generator configured to produce temporally successive trigger signals for triggering the at least one laser system. The microscope is configured such that an assignment of the trigger signals to the trigger
(Continued)

outputs and/or a time interval between successive ones of the trigger signals depends on the illumination parameters.

16 Claims, 4 Drawing Sheets

(58) Field of Classification Search
CPC ............ G02B 21/0052; G02B 21/0064; G02B 21/0076; G02B 21/008; G02B 21/0084; G02B 21/06; G02B 21/36; G02B 21/361; G02B 21/365; G02B 21/367
USPC ....... 359/362, 363, 368, 369, 385, 388, 389, 359/390
See application file for complete search history.

(56) References Cited

U.S. PATENT DOCUMENTS

| | | |
|---|---|---|
| 2005/0230610 A1 | 10/2005 | Schreiber |
| 2007/0081234 A1 | 4/2007 | Widzgowski |
| 2013/0140437 A1* | 6/2013 | Widzgowski ............. G01J 1/44 250/208.1 |
| 2013/0256564 A1* | 10/2013 | Hell ....................... G02B 21/16 250/459.1 |
| 2013/0307603 A1 | 11/2013 | Koester |
| 2014/0184089 A1* | 7/2014 | Porter ................... H05B 45/32 315/210 |
| 2019/0339500 A1* | 11/2019 | Widzgowski ...... G02B 21/0032 |

FOREIGN PATENT DOCUMENTS

| | | |
|---|---|---|
| DE | 202015001565 U1 | 10/2015 |
| EP | 1681589 A1 | 7/2006 |
| EP | 2081074 A1 | 7/2009 |

OTHER PUBLICATIONS

Borlinghaus, Rolf T., "Confocal Excitation: From Filter Wheels to AOTF," Tutorial, Dec. 9, 2011, pp. 1-4, Leica Microsystems, Germany.
Borlinghaus, Rolf T., "Confocal Excitation: From Filter Wheels to AOTF," Confocal Excitation: Leica Science Lab, Dec. 9, 2011, pp. 1-6, Leica Microsystems, Germany.
Borlinghaus, Rolf T., "Confocal Excitation: From Filter Wheels to AOTF," Science Lab by Leica Microsystems, Dec. 9, 2011, pp. 1-3, Leica Microsystems, Germany.

* cited by examiner

MICROSCOPE HAVING A FREELY PROGRAMMABLE LASER PULSE SEQUENCE, AND CORRESPONDING METHOD

CROSS-REFERENCE TO PRIOR APPLICATIONS

This application is a U.S. National Phase application under 35 U.S.C. § 371 of International Application No. PCT/EP2018/060533, filed on Apr. 25, 2018, and claims benefit to German Patent Application No. DE 10 2017 108 834.2, filed on Apr. 25, 2017. The International Application was published in German on Nov. 1, 2018 as WO 2018/197530 under PCT Article 21(2).

FIELD

The invention relates to a microscope, more particularly a confocal or light sheet microscope, comprising an illumination system for illuminating a sample chamber with laser pulses, and to a method for such an illumination. In particular, this relates to a PIE (pulse interleaved excitation) microscope and method.

BACKGROUND

In luminescence microscopy, as is carried out in particular using confocal or light sheet microscopes, pulsed lasers are used, inter alia, to excite dyes, so-called luminophores, to exhibit luminescence. The dyes are used as markers in order to ascertain certain properties of substances. By way of example, some dyes only bind to very specific molecules in a biological tissue. Consequently, the distribution of the dye in the sample provides information as to where the molecules on which the dye docks are situated. Further, there are dyes that modify their luminescence behavior depending on the bond formed. Using such dyes, it is possible to ascertain additional information about the type and/or state of the binding partner.

The luminescence of the dyes is usually only excited in a certain spectral band and comprises fluorescence, i.e., a brief afterglow in the range of less than one millisecond, and phosphorescence, i.e. longer afterglow of at least one millisecond.

A plurality of dyes can be used simultaneously in the sample chamber. In order to avoid crosstalk of the luminescent responses of the individual luminophores and in order to be able to, firstly, excite the luminophores in targeted fashion and, secondly, distinguish these from one another, use is preferably made here of luminophores that each have different excitation and emission bands. Nevertheless, crosstalk of the luminous responses of luminophores cannot be completely precluded in practice. Firstly, the luminophore may have more than one excitation band, and so it also luminesces if irradiated in the excitation band of another luminophore. Secondly, cascade effects may occur when a plurality of luminophores are used, and so one luminophore is excited by the luminescence of another luminophore.

These problems are known and reduced by the PIE method, in which the individual lasers that provide the various excitation bands for the different luminophores are alternately actuated in succession. By way of example, the method is described in the article: "Tunable PIE and Synchronized Gating Detections by FastFLIM for Quantitative Microscopy Measurements of Fast Dynamics of Single Molecules" in: Multiphoton Microscopy in the Biomedical Sciences XVI, Proc. of SPIE Vol. 9712, 97120S. In PIE, use is made of two or more lasers that produce laser pulses with different spectral excitation frequencies at constant time intervals. Here, the constant time interval between the individual laser pulses is at least as long as the longest afterglow time of the luminophores used in the sample chamber. The laser pulses alternately illuminate the sample chamber such that all luminophores are excited in succession.

SUMMARY

In an embodiment, the present invention provides a microscope which includes an illumination system configured to illuminate a sample chamber with laser pulses. The illumination system includes a control device with stored, modifiable illumination parameters, with trigger outputs, to which at least one externally triggerable laser system is connectable in each case, and with a trigger generator configured to produce temporally successive trigger signals for triggering the at least one laser system. The microscope is configured such that an assignment of the trigger signals to the trigger outputs and/or a time interval between successive ones of the trigger signals depends on the illumination parameters.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Even if a multiplicity of problems of luminescence microscopy can be avoided using the PIE method, there is a need for improvements, particularly in the direction of an automatable application in which the microscope can independently examine various samples with different luminophores over a relatively long period of time.

Embodiments of the invention provide a microscope and a microscopy method that facilitates such automation.

According to an embodiment of the invention, this facilitated automation is achieved by a microscope of the type set forth at the outset, in which the illumination system comprises a control device with stored pulse parameters, in a manner modifiable by user interactions in particular, with trigger outputs, to which one externally triggerable laser system is connectable in each case, and comprises a trigger generator for producing temporally successive trigger signals for triggering laser systems or laser pulses, wherein an assignment of the trigger signals to the trigger outputs and/or a time interval between successive trigger signals are/is dependent on the pulse parameters.

Further, the facilitated automation is achieved according to an embodiment of the invention by a method for illuminating a sample chamber in microscopy, in particular in confocal or light sheet microscopy, by means of at least two laser systems that produce laser pulses, wherein the sequence of the laser pulses, the time interval between two successive laser pulses of the same laser and/or the time interval between two successive laser pulses of different lasers are controlled, more particularly electronically controlled, by a control device in a manner modifiable by user interactions in particular.

Finally, the facilitated automation is also achieved according to an embodiment of the invention by an upgrade kit for installation in a microscope of the type set forth at the outset. As a result of installing the upgrade kit into an existing microscope, a microscope according to an embodiment of the invention of the type described above is obtained. To this end, the upgrade kit comprises a control device with storable pulse parameters that are modifiable by user interactions, with trigger outputs, to which at least one externally triggerable laser system is connectable in each case, and with a trigger generator for producing temporally successive trigger signals, wherein an assignment of the trigger signals to the trigger outputs and/or a time interval between successive trigger signals are/is dependent on the pulse parameters.

The microscopes configured according to embodiments of the invention can be used more flexibly and in automatable fashion in luminescence microscopy. By setting the pulse parameters, the user can freely decide the time at which a certain laser system emits a laser pulse. By way of example, in a confocal or light sheet microscope, the laser pulse or the spectrum thereof sets the luminophore that is excited at the currently scanned point of the sample volume. The adjustability of the pulse parameters allows a flexible adaptation of the illumination conditions in a sample volume, where it is now possible, for example, to illuminate a portion in the form of a "region of interest" differently in comparison with the surroundings thereof, or the sample chambers of successively examined, different samples, for example of a microfilter plate, can each be illuminated in a manner adapted to the luminophores used in the respective sample.

A further advantage of an embodiment of the invention lies in the fact that the time of a laser pulse can be optimally adapted to the decay of the luminescence of the laser pulse, which was triggered by the preceding trigger signal, by way of changing the time interval between the individual trigger signals and the variable assignment thereof to the trigger outputs. The time intervals between two successive laser pulses of a laser system in each case and/or two successive laser pulses of different laser systems in each case can be set individually for each pulse pair.

The laser systems comprise externally triggerable lasers, such as, e.g., diode lasers, and/or lasers that are not triggerable per se but have additional, triggerable elements that, for example in the case of pulsed lasers or pulse lasers, allow a pulse selection or, for example in the case of CW lasers, facilitate a pulse production, such as pulse pickers, electro-optic or acousto-optic elements, e.g. AOTFs.

Consequently, there is a substantial difference between an embodiment of the invention and the previously known PIE solutions, in which only a sequence of laser pulses that is constant in time is produced in each case.

Embodiments of the invention can be improved by the developments set forth below, which are each advantageous per se and which can be combined with one another as desired.

Thus, in an advantageous configuration, the control device may comprise a clock input, to which a clock generator is connectable for entering an illumination system clock. In particular, the clock generator can be a free-running laser, in particular a pulse laser, which is not externally triggerable, for example. This is advantageous to the extent that no directly externally triggerable laser, these are diode lasers in particular, is available for the excitation frequencies of some luminophores. The illumination system clock can be derived from the clock of the laser by frequency multiplication or period multiplication. The non-triggerable laser forms the time base for the production of the further laser pulses by the remaining lasers in this configuration.

Incidentally, the use of a uniform illumination system clock can ensure a uniform time base for the production of the individual luminescence effects. Naturally, an electronic component, such as an oscillator for example, can also be used as a clock generator as an alternative, or in addition, to a laser. This lends itself, in particular, if no free-running laser is used.

The trigger signals are preferably synchronized in time with the illumination system clock. This can be achieved by virtue of the time intervals between successive trigger signals being derived by the illumination system clock, for example by frequency multiplication or period multiplication. To this end, the control device may comprise a frequency splitter or frequency multiplier. According to a further advantageous configuration, a phase angle of the trigger signals relative to the illumination system clock may be set in the pulse parameters. Here, the phase angle of each individual trigger signal may also be saved individually in the pulse parameters.

In a further configuration, a different time interval of the trigger signals assigned to the respective trigger output may be assigned in the pulse parameters to each trigger output.

A further advantage arises if there is a synchronization of the illumination system clock and a pixel clock, in which a light-sensitive detector that is connectable to the microscope or connected to the microscope in each case captures a partial volume of the sample chamber and/or is read. A two-dimensional or three-dimensional image of the sample chamber can be created in an image processor from the pixels captured by the photodetector. In one configuration, the photodetector can capture only a single pixel in each case. In other configurations, the photodetector can simultaneously capture a pixel row or a two-dimensional pixel field.

The pixel clock is determined by the time required by the detector to record a pixel and output the latter for further processing. Usually, the pixel clock period is delimited below by a minimum value that is predetermined by the electronics. A relatively long pixel clock period may be required to record the luminescence responses to a multiplicity of laser pulses.

The synchronization of pixel clock and illumination system clock ensures that a trigger signal sequence that is precisely defined by the pulse parameters and, consequently, a laser pulse sequence can be predetermined for each pixel of the (partial) image captured by the detector, even in the case of a changing sequence of laser pulses and in the case of changing pulse intervals. Either the illumination system clock can be synchronized with the pixel clock, particularly if use is made of only externally triggerable laser systems, or the pixel clock can be synchronized with the illumination system clock. In the first variant, the pixel clock determines the illumination system clock; in the second variant, the illumination system clock determines the pixel clock.

For the purposes of synchronizing the detector and illumination system, the control device may comprise a clock output at which a clock input of the detector is connectable and/or connected. The illumination system clock is able to be output at the clock output during operation. Alternatively, the detector can be connectable and/or connected to the clock input.

In particular, the control device may comprise a non-volatile memory in which the pulse parameters are saved. A set of illumination parameters can be assigned to each pixel. Naturally, a volatile memory, which is initialized by loading a file prior to use for example, can also be used instead of a non-volatile memory.

According to a further advantageous configuration, respectively one pulse parameter or a set of pulse parameters can be freely assignable or assigned to individual pixels in the control device. To this end, the control device may comprise a memory section that represents at least one region of the sample chamber. The memory section can be subdivided into grid elements that each represent a portion of the region of the sample chamber. A set of pulse parameters can be assigned to each grid element. Preferably, a grid element of the memory section corresponds to a pixel or plurality of adjacent pixels of an image of the sample chamber recorded by the detector.

The user can assign an individual sequence of laser pulses to each pixel in such a set of pulse parameters. A plurality of such sets of pulse parameters may be present.

According to a further advantageous configuration, the microscope may comprise an optical scanning device for raster-type scanning of the sample chamber by the laser pulses. The raster-type scanning can be implemented point-by-point or line-by-line by virtue of the pulses passing through the sample chamber in a manner coaxial to the optical axis of the detector (point-by-point scanning) or transverse to the optical axis of the detector (line-by-line scanning). Scanning can be carried out in all three spatial directions in the case of a sample stage that is movable in all three spatial directions. A grid point of the grid produced by the scanning device need not necessarily correspond to a pixel in terms of its spatial extent. Thus, a grid point can correspond to a field of pixels or a pixel can correspond to a field of grid points. Naturally, a pixel may also correspond to a grid point. The grid produced by the optical scanning device can be represented in the memory section at least partly representing the sample chamber.

According to a further advantageous configuration, the control device may comprise a trigger sequence memory in which a sequence of trigger signals and the trigger outputs assigned to the respective trigger signals are assigned to a pixel or at least to a subset of the pixels of the sample chamber for the purposes of controlling the illumination of said pixel. The trigger sequence memory can comprise at least one memory element for each pixel and/or each grid point. Moreover, the trigger sequence memory may comprise a memory element for each trigger output.

The memory elements of the trigger sequence memory may contain a marker that, when placed, triggers at the respective trigger output a trigger signal produced by the trigger generator. In this configuration, the memory elements are read with the illumination system clock or in a clock derived therefrom. Here, the trigger sequence memory can be subdivided into portions that are each assigned to a trigger output and in which the trigger sequence for this trigger output is saved. In this configuration, the portions can each be read in parallel, separately for each trigger output. In particular, the memory elements of the trigger sequence memory may comprise a memory capacity of 1 bit in this configuration in order to facilitate very fast clock cycles. Each read unit of the trigger memory is assigned to respectively one trigger output.

However, the memory elements of the trigger sequence memory may also comprise a memory capacity of several bits. Each trigger output can be assigned to a bit. In this case, the trigger output assigned to a bit is activated depending on the content of the currently read memory element and, at the trigger output, the production of a trigger signal by the trigger generator is prompted.

The trigger sequence memory can be created or have been created automatically in the control device from the memory section representing the region of the sample chamber by virtue of the trigger sequences of the memory section saved for the individual grid elements being read in the sequence of the grid points scanned by the scanning device.

The control device may be an FPGA or an ASIC. The method can be carried out by a program executed in the control device, wherein the program may be saved on a non-volatile storage medium.

The invention will be explained in exemplary fashion below on the basis of an exemplary embodiment, with reference being made to the attached drawings. For reasons of simplicity, the same reference signs are used in the drawings for elements that correspond to one another in terms of function and/or structure. In accordance with the explanations made above, individual elements of the exemplary embodiment can be dispensed with if the technical effect of said element should not be decisive in a certain application. Conversely, an above-described feature, which does not occur in the exemplary embodiment described below, may be added should the technical effect thereof be required.

Figure 1:
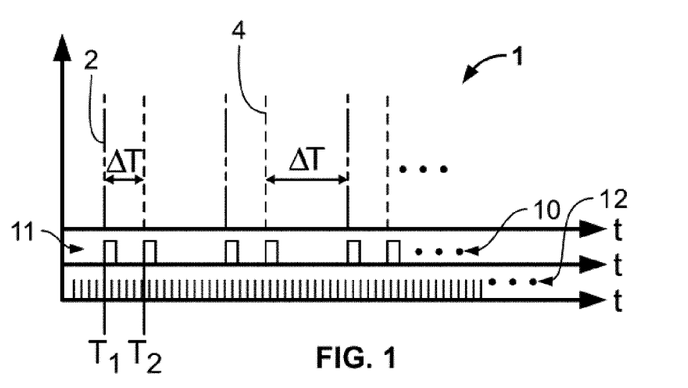
FIG. 1 shows a schematic illustration of a temporal sequence of laser pulses.

FIG. 1 shows a laser pulse sequence 1 of temporally (time t) successive laser pulses 2, 4 in different frequency bands.

Figure 2:
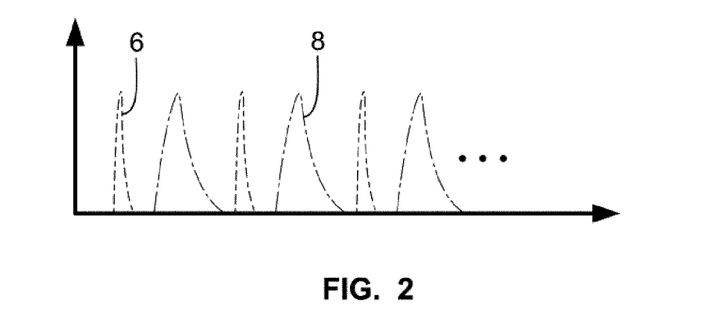
FIG. 2 shows a schematic illustration of a temporal sequence of luminescence responses to the laser pulses of FIG. 1.

FIG. 2 schematically illustrates the luminescence responses 6, 8 of two luminophores triggered by the laser pulses 2, 4.

By way of example, the one laser pulse 2 can excite a luminophore whose luminescence response 6 is shorter than the luminescence response 8 of the second luminophore, which is excited by the second laser pulse 4 at a different frequency. The luminescence frequencies of the two luminophores preferably have as little spectral overlap as possible in order to be able to excite the luminophores independently of one another and distinguish these from one another on the basis of their response.

If externally triggerable laser systems, such as, e.g., diode lasers, are used to produce the laser pulses 2, 4, the times $T_1$, $T_2$ of the laser pulses 2, 4 and/or the time interval $\Delta T$ therebetween, i.e., the phase angle thereof in relation to one another, can be controlled individually, i.e., for each laser pulse, by trigger signals 10. If CW lasers are used, the laser pulses 2, 4 at the times $T_1$, $T_2$ can be produced with the aid of a pulse production device that is triggered externally by a trigger signal 10. In the case of pulse lasers, use can be made of a pulse selection device that is triggerable by trigger signals 10, for example a pulse picker, for the purposes of producing the laser pulses. The pulse production device and/or pulse selection device can use electro-optic and/or acousto-optic elements such as an AOTF, acousto-optic tunable filter.

The trigger signals 10 are preferably produced in the form of a trigger sequence 11 on the basis of an illumination system clock 12, for example by frequency multiplication or period multiplication of the illumination system clock 12. This simplifies the synchronization of the laser pulses among themselves and with peripheral devices of the microscope.

The differently long luminescence responses 6, 8 of the luminophores can be taken into account as a result of a different time interval $\Delta T$ between successive laser pulses 2, 4. Thus, a longer time interval $\Delta T$ should be provided in each case between a preceding laser pulse 4 of a first laser system and a subsequent laser pulse 2 of a second laser system than between a preceding laser pulse 2 of the second laser system and a subsequent laser pulse 4 of the first laser system on account of the longer luminescence response 8 of the second luminophore.

Laser pulses can be produced in very different excitation bands in order to excite very different luminophores. The time interval $\Delta T$ between two successive laser pulses is substantially only bounded below by the length of the luminescence response triggered by the first laser pulse. If there is no interaction and additionally no crosstalk between two or more luminescence responses of two or more luminophores, the laser pulses for exciting these luminophores can also be output simultaneously.

Figure 3A:
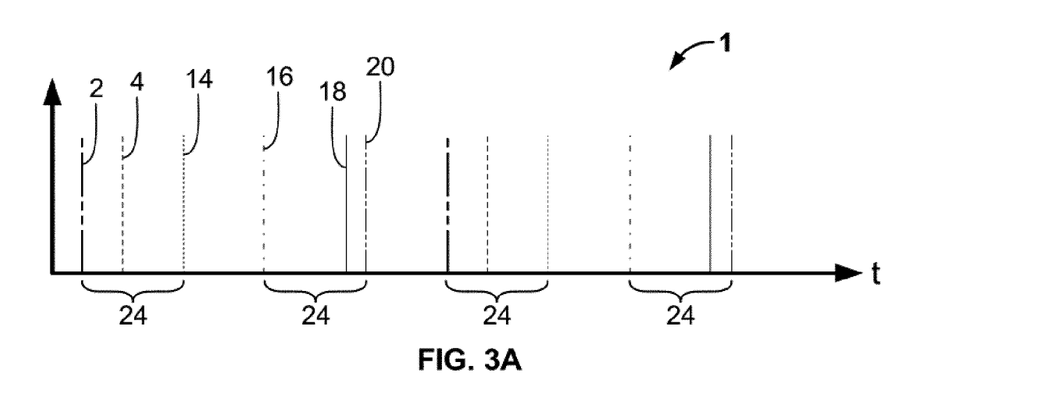
FIG. 3A shows a schematic illustration of further sequences of laser pulses.
Figure 3B:
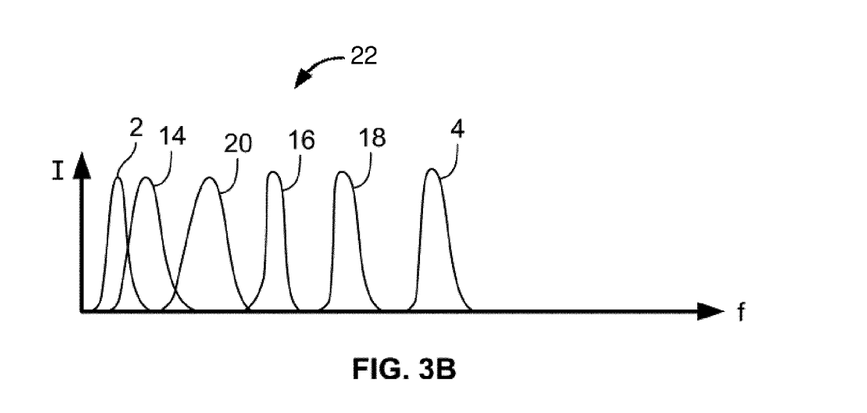
FIG. 3B shows a schematic illustration of the spectral bands of the laser pulses of FIG. 3A.

FIG. 3A shows a laser pulse sequence 1 that is composed of laser pulses 2, 4, 14, 16, 18, 20 which each contain different excitation spectra, the latter preferably being discrete but also being able to overlap. In FIG. 3B, the spectra 22 of the laser pulses 2, 4, 14, 16, 18, 20 of FIG. 3A are plotted over frequency f in schematic and normalized fashion.

As may further be identified in FIG. 3A, one or more partial sequences 24 of the laser pulse sequence 1 may be combined in each case. By way of example, such a partial sequence 24 can be assigned to a grid point of a sample chamber of a microscope scanned in raster-type fashion or to a pixel of an image of the sample chamber. The time of each laser pulse and the sequence of the laser pulses within one partial sequence 24 is set individually by the trigger signals 10 in a manner independent of the remaining partial sequences 24.

Figure 4:
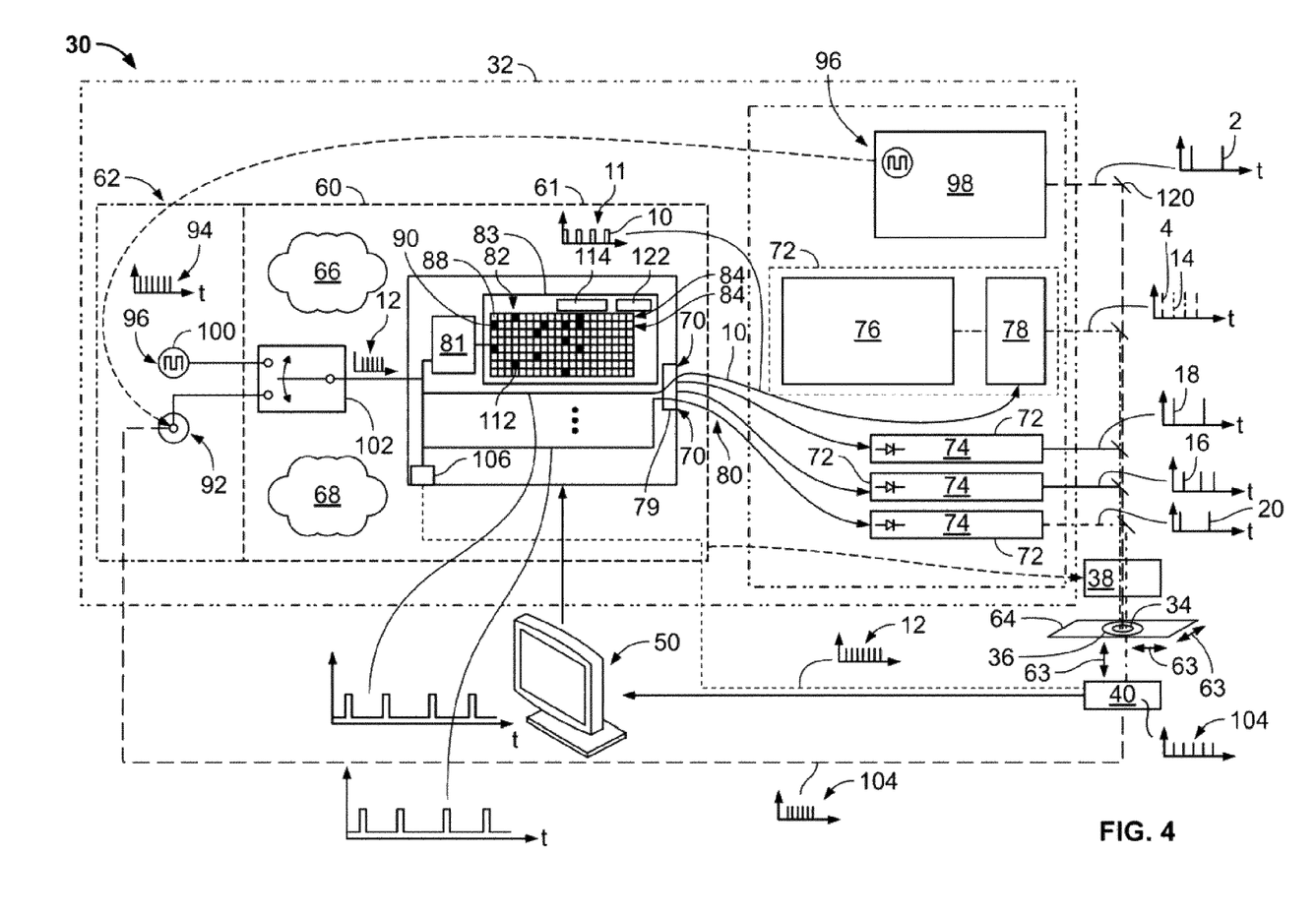
FIG. 4 shows a schematic illustration of a microscope according to the invention.

This is explained below on the basis of FIG. 4, on the basis of which the structure and function of a microscope 30 according to the invention are described.

The microscope 30 comprises an illumination system 32, by means of which a sample chamber 34 is illuminated by laser pulses. During the operation of the microscope 30, the sample 36 to be examined, or part of the sample 36, is arranged in the sample chamber 34.

The microscope 30 can be embodied as a confocal or light sheet microscope. It may comprise a scanning device 38 that may comprise a beam deflector, more particularly a movable beam deflector. As a result of the scanning device 38, the illumination, in this case the laser pulses, are moved through the sample chamber 34 in raster-type fashion. The grid can lie in space as desired.

Figure 5:
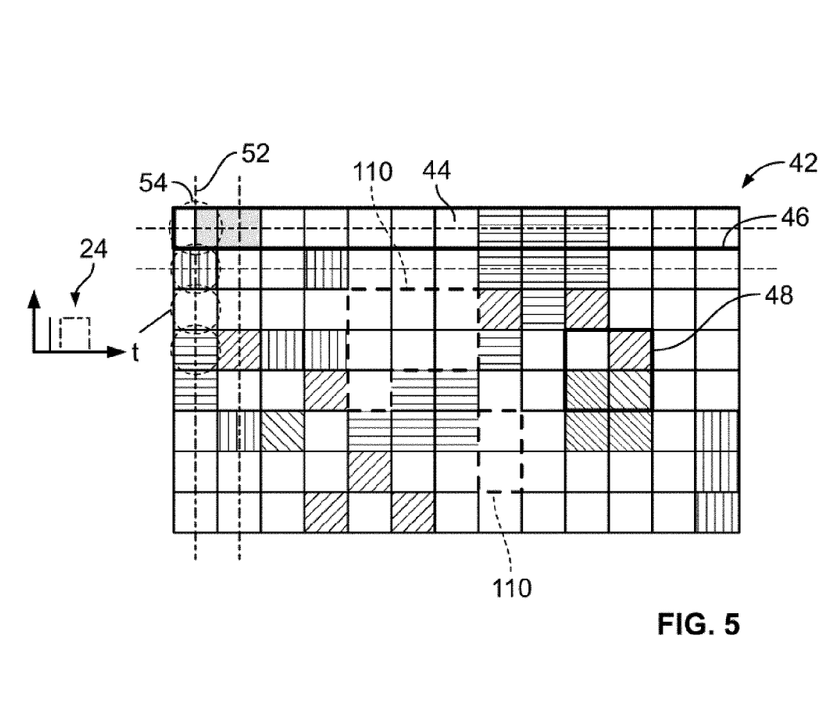
FIG. 5 shows a schematic illustration of an image produced by the microscope of FIG. 4.

In one configuration level, the microscope 30 may comprise a light-sensitive detector 40, more particularly a color-sensitive detector, which is directed on the sample chamber 34. An image 42 of the sample chamber is created from pixels 44 with the aid of the detector 40. FIG. 5 schematically shows such an image 42.

The detector 40 can be configured as a point detector, line detector or matrix detector. Here, a point detector only captures in each case a single pixel 44, a line detector captures a line 46 of pixels 44 and a matrix detector captures a two-dimensional field 48 of pixels 44. Use is preferably made of a point detector. The scanning device 38 can be arranged in the beam path of the detector 40 such that the detector 40 always only captures the region that is currently illuminated. The laser pulses can pass through the sample chamber 34 in coaxial fashion and/or in a manner transverse to an optical axis or observation direction of the detector 40. The excitation light is separated from the fluorescence light by the detector by means of optical filters. Only the fluorescence light is supplied to the detector 40. Assigning the pixel coordinates to the luminous energy captured by the detector is possible by capturing the current position of the scanning apparatus 38. To this end, the scanning apparatus 38 can be provided with position measuring devices, such as rotary encoders or linear encoders.

The image 42 is presented on a display 50, which may be part of the microscope 30.

The assignment of the pixels 44 to the grid 52, over which the scanning device 38 scans the sample chamber, can be as follows in this case: respectively one point 54 of the grid 52 may correspond to one pixel 44, a plurality of adjacent grid points 42 may correspond to one pixel 44 or one grid point 42 may correspond to a plurality of adjacent pixels 44.

Preferably, a partial sequence 24 (FIG. 3A) of a laser pulse sequence 1 is assigned to each grid point 54 and/or each pixel 44. The laser pulses 2, 4, 14, 16, 18, 20 involved in the partial sequence 24 and the times $T_1, T_2, \ldots$ thereof and also the time interval $\Delta T$ between the individual laser pulses are freely definable for each grid point 54 and each pixel 44 by a user as illumination parameters.

For the purposes of producing a laser pulse sequence 1, the microscope 30 comprises a control device 60 (FIG. 4), which may also be embodied as a subsequently installable upgrade kit 62.

The control device 60 comprises one or more integrated circuits 61, preferably in the form of at least one FPGA or ASIC. The control device 60 serves to control the illumination system 32; however, it may also comprise additional control elements, such as, e.g., a controller 66 of the scanning device 38 and/or a system controller 68 of the entire microscope 30, for example for controlling the movement 63 of a microscope stage 64, for controlling the microscope configuration such as automatic saving of image data, incorporating the microscope in a communications network and the setting of personal preferences of a user. Naturally, the control device 60 for the illumination system 32 may also be part of a system controller 68, which is superordinate in that case. The microscope stage 64 may be movable in two or three dimensions.

The control device 60 comprises trigger outputs 70, to which at least one externally triggerable laser system 72 is connectable in each case.

A laser system 72 can comprise a directly externally triggerable laser 74, for example a diode laser, or else a not externally triggerable pulse laser, for example a supercontinuum laser or white light laser, or else a CW laser. A not externally triggerable laser 76 can be provided with an additional externally triggerable pulse production/pulse selection device 78, for example a pulse picker and/or controllable, also frequency-selective absorber elements, such as, e.g., electro-optic or acousto-optic elements such as an AOTF.

A trigger signal 10 or trigger sequence 11 is able to be output at each trigger output 70. Whenever a trigger signal 10 is present at a trigger output 70, the laser system 72, 74 connected to this trigger output 70 produces a laser pulse 2, 4, 14, 16, 18, 20 with a fixed, reproducible temporal relationship with the presence of the trigger signal 10 at the trigger output 70.

If use is made of a laser system 72 that can produce laser pulses with different exciter spectra, such as a supercontinuum laser 76, for example, it is also possible to assign a plurality of trigger outputs 70 to a single laser system 72. In such a laser system 72, the at least one trigger output 70 is connected to the pulse production/pulse selection device 78. Preferably, a single excitation spectrum 22 (FIG. 3B) is assigned to each trigger signal 10, said individual excitation spectrum exciting only a single luminophore or a plurality of predetermined luminophores.

The trigger outputs 70 may also be unified in a uniform trigger interface 79, which, for example, couples the different laser systems 72 in a bus system 80 with one another. In this case, a trigger signal 10 may have a section as a data element that determines the time of output of the laser pulse. The bus clock may be synchronized with the illumination system clock. The detector 40, too, may be connected to such a bus system. Care should be taken for an accurately reproducible, precise timing if such a bus system is used. Alternatively, the trigger signals could also be transmitted by separate lines, which can be coupled to one another in star-shaped fashion.

Further, the control device 60 comprises a trigger generator 81, by means of which the trigger signals 10 are produced in the format required for the laser systems 72 in each case. The sequence of the individual trigger signals 10 and the assignment of the respective trigger signal 10 to one or more of the trigger outputs 70 can be saved in a trigger sequence memory 82. The trigger sequence memory 82 is part of a memory 83 of the control device 60. The memory can be volatile, for example RAM, or non-volatile. By way of example, the trigger sequence memory 82 can be loaded from a file on startup of the control device 60.

The trigger sequence memory can be constructed in various ways. Thus, for example, a dedicated region 84 of the trigger sequence memory 83 can be provided for each trigger output 70. The regions 84 are read simultaneously with the illumination system clock 12. If the currently read memory element 88 receives a marker 90, illustrated as a blackened memory element 88 in FIG. 4, which represents the output of a trigger signal 10 at the respective trigger output 70, a trigger signal is produced at the respective trigger output 70. This way of producing triggers facilitates very high pulse frequencies since each memory element 88 only requires a memory capacity of 1 bit and consequently can be read very quickly. The regions 84 can be read in parallel or in a multiplexing method. The marker 90 and its position in the trigger sequence memory 83 represent a pulse parameter that controls the output of a laser pulse.

Alternatively, the trigger sequence memory 82 may also be read entirely in sequential fashion. In this case, each memory element 88 may contain a marker 90 that specifies the trigger output at which a trigger signal 10 should be output when this memory element 88 is read. This requires a memory element 88 that has a memory capacity of several bits, wherein each bit may represent a signal output. In such a case, each memory element 88 of the trigger sequence memory 83 may correspond to a pixel 44 and/or a grid point 54. A trigger sequence 24 is saved in the trigger sequence memory 83 for each pixel 44 and/or grid point 54, it being possible to distinguish said trigger sequence from the trigger sequence 24 of the remaining pixels and/or grid points 54 in respect of the intervals, sequence and selection of the laser pulses produced by the trigger signals.

The control device 60 may comprise a clock input 92 for providing the illumination system clock 12. The clock 94 present there determines the illumination system clock 12, wherein the illumination system clock 12 may also be derived from the clock 94 by frequency multiplying or period multiplying in the control device 60.

A clock generator 96 may be connected to the clock input 92. The clock generator 96 may be a clock-providing laser 98, for example a free-running laser. The clock-providing laser may likewise produce laser pulses for illuminating the sample chamber. The clock generator 96 may, alternatively or else cumulatively, be an electronic component 100, for example an oscillator, which may also be integrated into the control device 60. A changeover switch 102 may be provided in the control device 60 for switching between different clock generators 96.

By way of example, the detector 40 may also be connected to the clock input in order to synchronize the illumination system clock 12 with a pixel clock 104 of the detector should the detector have an inherent clock with which it makes data available. Since the pixel clock 104 may be slower than the illumination system clock 12 by orders of magnitude, said illumination system clock 12 may be derived from the pixel clock by frequency multiplication. In another configuration, the detector is simply read with the illumination system clock 12 or in a manner synchronized with the illumination system clock.

The trigger sequence memory 82 allows any sequence of the laser pulses 2, 4, 14, 16, 18, 20, the time intervals thereof, the time interval between two successive laser pulses of different lasers during the capture of a pixel and/or the time interval of two successive laser pulses of the same laser during the capture of successive pixels to be variably predetermined for any pixel 52 of the image 48 of the sample chamber 34. Alternatively, or cumulatively, this variable prescription can be implemented for any subset 110, in particular also contiguous subsets 110 of the pixels of an image 42 of the sample chamber 34 (FIG. 5). Thus, for example, a region of interest within the sample chamber 34 can have applied an identical pulse sequence 24, which differs from the pulse sequence in the remaining sample chamber.

This free programmability of the pulse sequence 1, 24 assigned to a pixel 44 can be extended to various samples 36 or sample chambers 34 such that a large sample 36 or a plurality of different samples 36 can be worked through in succession by the microscope 30.

The memory 83 of the control device 60 has pulse parameters 112, which may be assigned to grid points 54 or pixels 44. This is briefly explained with reference to FIG. 6.

Figure 6:
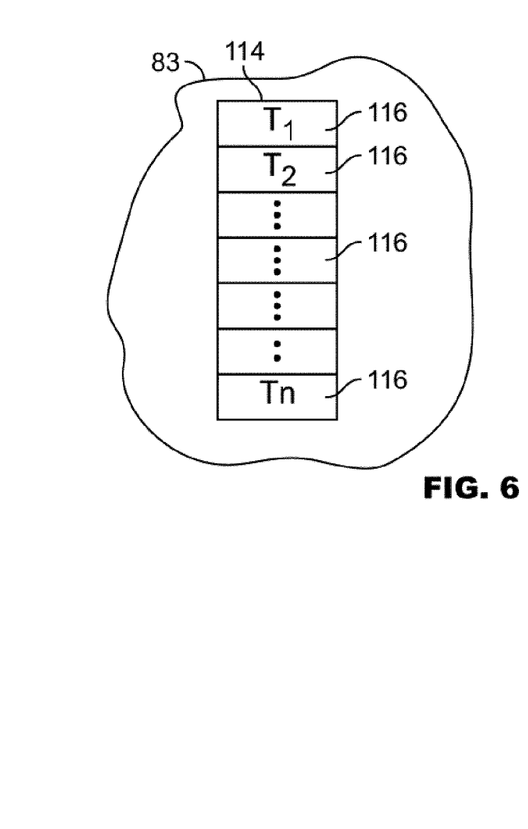
FIG. 6 shows a schematic illustration of a memory element with illumination parameters.

At least one data field 114 of the memory 83 contains elements 116 that correspond to the pulse parameters 112. Thus, for example, the time $T_1$ of the first laser pulse 2 relative to the pixel clock 104 and the further times $T_2, \ldots$ of the further laser pulses 2, 4, 14, 16, 18, 20 may be contained in an element 116 as pulse parameters 112. If a data field has been set to zero, the laser pulse of the laser system 72 assigned to this data field via the trigger output is not triggered. By contrast, if a data field is set to one, the laser pulse is triggered. Naturally, this may also be reversed, and a laser pulse may be triggered in the case of a data field set to zero and not triggered in the case of one. The individual pulse parameters 112 are modifiable by user interactions, for example via a GUI. Each data field is preferably assigned to one or more grid points 54 and/or pixels 44. The trigger sequence memory 82 can be constructed once this assignment has been implemented. Instead of the times $T_1, T_2, \ldots$, the time intervals $\Delta T$ between successive trigger signals 10 and/or the clock numbers of the illumination system clock 12 corresponding to the times may also be specified in the elements 116.

The laser pulses produced by the laser systems 72 or the laser 98 are then guided to the scanning device 38, for example via dichroic mirrors 120. Both the electronic and optical paths within the control device 60 and between the control device 60 and the sample chamber 36 are measured and stored in the memory 83 as correction data 122 for calibrating the time-of-flight. The values in the elements 116 are corrected by means of the correction data 122 in order to take account of the actual response, signal and light time-of-flight times which differ in the individual lasers such that the laser pulses arrive in the sample chamber 34 at exactly the required time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Laser pulse sequence
2, 4 Laser pulse
6, 8 Luminescence response of a luminophore
10 Trigger signal
11 Trigger sequence
12 Illumination system clock
14, 16, 18, 20 Laser pulse
22 Spectrum of a laser pulse
24 Partial sequence of laser pulses
30 Microscope
32 Illumination system
36 Sample chamber
38 Sample
40 Scanning device
42 Detector
44 Image
46 Pixel
50 Line of pixels
52 Two-dimensional field of pixels
50 Display
52 Sample chamber scanning grid
54 Grid point
60 Control device
61 Integrated circuit
62 Upgrade kit
63 Movement of the microscope stage
64 Microscope stage
66 Controller of the scanning device
68 System controller
70 Trigger output
72 Laser system
74 Diode laser
76 CW laser
78 Pulse production/pulse selection device
79 Trigger interface
80 Bus system
81 Trigger generator
82 Trigger sequence memory
83 Memory of the control device
84 Region of the trigger sequence memory for a trigger output
88 Memory element
90 Marker
92 Clock input
94 Clock at the clock input
96 Clock generator
98 Clock-providing laser
100 Electronic component
102 Changeover switch
104 Pixel clock
106 Clock output
110 Subset of pixels
112 Pulse parameter
114 Data field of the memory
116 Element of the data field/value of a pulse parameter
120 Dichroic mirror
122 Correction data

The invention claimed is:

1. A microscope, comprising:
an illumination system configured to illuminate a sample chamber with laser pulses, the illumination system including a control device with stored, modifiable illumination parameters, with trigger outputs, to which at least one externally triggerable laser system is connectable in each case, and with a trigger generator configured to produce temporally successive trigger signals for triggering the at least one laser system,
wherein the microscope is configured such that an assignment of the trigger signals to the trigger outputs and/or a time interval between successive ones of the trigger signals depends on the illumination parameters, and
wherein different numbers of trigger signals, different assignments of the trigger outputs to the trigger signals and/or different time intervals between the trigger signals are predetermined for different pixels.

2. The microscope as claimed in claim 1, wherein the control device comprises a clock input for entering an illumination system clock from a clock generator and wherein the trigger signals are synchronized with the illumination system clock.

3. The microscope as claimed in claim 2, wherein the at least one laser system or a detector directed on the sample chamber is connected as a clock generator to the control device.

4. The microscope as claimed in claim 1, wherein the control device comprises a clock output, to which a detector is connectable.

5. The microscope as claimed in claim 2, further comprising a detector with a pixel clock that has been synchronized to the illumination system clock.

6. The microscope as claimed in claim 1, wherein the control device includes a memory representing the sample chamber, wherein memory elements of the memory are assignable to pixels of an image produced by a detector, and wherein at least one of the illumination parameters is saved in one of the memory elements in each case.

7. The microscope as claimed in claim 1, further comprising an optical scanning device configured to scan the sample chamber over a grid constructed from grid points, wherein at least one of the illumination parameters is assigned to each of the grid points in each case in the control device.

8. The microscope as claimed in claim 1, wherein an externally triggerable diode laser is connected to at least one of the trigger outputs.

9. The microscope as claimed in claim 1, wherein the at least one laser system with a laser and a separate pulse generation device is connected to at least one of the trigger outputs.

10. An upgrade kit for installation in a microscope and for providing the microscope as claimed in claim 1 following the installation, the upgrade kit comprising the control device with the illumination parameters that are modifiable by user interactions, with the trigger outputs, to which the at least one externally triggerable laser system is connectable in each case, and with the trigger generator configured to produce the temporally successive trigger signals, wherein the microscope is configured such that the assignment of the trigger signals to the trigger outputs and/or the time interval between successive trigger signals depends on the illumination parameters.

11. The upgrade kit as claimed in claim 10, wherein the microscope is a confocal or light sheet microscope.

12. The microscope as claimed in claim 1, wherein the microscope is a confocal or light sheet microscope.

13. The microscope as claimed in claim 1, wherein the microscope is configured such that the time interval between successive ones of the trigger signals depends on the illumination parameters.

14. A microscope, comprising:
an illumination system configured to illuminate a sample chamber with laser pulses, the illumination system including a control device with stored, modifiable illumination parameters, with trigger outputs, to which at least one externally triggerable laser system is connectable in each case, and with a trigger generator configured to produce temporally successive trigger signals for triggering the at least one laser system, wherein the control device comprises a clock input for entering an illumination system clock from a clock generator and wherein the trigger signals are synchronized with the illumination system clock; and
a detector with a pixel clock that has been synchronized to the illumination system clock,
wherein the microscope is configured such that an assignment of the trigger signals to the trigger outputs and/or a time interval between successive ones of the trigger signals depends on the illumination parameters.

15. A microscope, comprising:
an illumination system configured to illuminate a sample chamber with laser pulses, the illumination system including a control device with stored, modifiable illumination parameters, with trigger outputs, to which at least one externally triggerable laser system is connectable in each case, and with a trigger generator configured to produce temporally successive trigger signals for triggering the at least one laser system,
wherein the microscope is configured such that an assignment of the trigger signals to the trigger outputs and/or a time interval between successive ones of the trigger signals depends on the illumination parameters, and
wherein the control device includes a memory representing the sample chamber, wherein memory elements of the memory are assignable to pixels of an image produced by a detector, and wherein at least one of the illumination parameters is saved in one of the memory elements in each case.

16. A microscope, comprising:
an illumination system configured to illuminate a sample chamber with laser pulses, the illumination system including a control device with stored, modifiable illumination parameters, with trigger outputs, to which at least one externally triggerable laser system is connectable in each case, and with a trigger generator configured to produce temporally successive trigger signals for triggering the at least one laser system; and
an optical scanning device configured to scan the sample chamber over a grid constructed from grid points, wherein at least one of the illumination parameters is assigned to each of the grid points in each case in the control device,
wherein the microscope is configured such that an assignment of the trigger signals to the trigger outputs and/or a time interval between successive ones of the trigger signals depends on the illumination parameters.

* * * * *